United States Patent
Zuo

(10) Patent No.: US 10,761,668 B2
(45) Date of Patent: Sep. 1, 2020

(54) TOUCH SUBSTRATE, TOUCH PANEL, AND TOUCH DISPLAY DEVICE

(71) Applicant: BOE TECHNOLOGY GROUP CO., LTD., Beijing (CN)

(72) Inventor: Cheng Zuo, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 677 days.

(21) Appl. No.: 15/757,895

(22) PCT Filed: Aug. 14, 2015

(86) PCT No.: PCT/CN2015/086948
§ 371 (c)(1),
(2) Date: Mar. 6, 2018

(87) PCT Pub. No.: WO2016/107186
PCT Pub. Date: Jul. 7, 2016

(65) Prior Publication Data
US 2020/0233532 A1  Jul. 23, 2020

(30) Foreign Application Priority Data
Dec. 31, 2014  (CN) .......................... 2014 1 0851791

(51) Int. Cl.
*G06F 3/041* (2006.01)
*G06F 3/044* (2006.01)

(52) U.S. Cl.
CPC .......... *G06F 3/0446* (2019.05); *G06F 3/0412* (2013.01); *G06F 3/0448* (2019.05)

(58) Field of Classification Search
CPC ........ G06F 3/041; G06F 3/0412; G06F 3/044; G06F 3/045
See application file for complete search history.

(56) References Cited

U.S. PATENT DOCUMENTS 9,244,572 B2 * 1/2016 Singh ...................... G06F 3/044
2010/0007627 A1   1/2010 Lai et al.
(Continued)

FOREIGN PATENT DOCUMENTS

CN   103218089 A  *  7/2013
CN   103218089 A     7/2013
(Continued)

OTHER PUBLICATIONS

International Search Report dated Aug. 14, 2015, issued in counterpart International Application No. PCT/CN2015/086948 (5 pages).

*Primary Examiner* — Joe H Cheng
(74) *Attorney, Agent, or Firm* — Westerman, Hattori, Daniels & Adrian, LLP

(57) ABSTRACT

The present disclosure provides a touch substrate, a touch panel and a touch display device. The touch substrate includes a first electrode extending in a first direction. The first electrode is of a U shape, and includes a first longitudinal portion extending in the first direction, a second longitudinal portion extending in the first direction, and a third connecting portion. The first longitudinal portion includes a first terminal at an distal end from the connecting portion, and the second longitudinal portion includes a second terminal at an distal end from the connecting portion. In the touch substrate, the first and second electrodes are powered from both ends. The metal wirings connecting the electrodes to the bonding pins do not cross.

14 Claims, 4 Drawing Sheets

(56) References Cited

U.S. PATENT DOCUMENTS

| | | | | |
|---|---|---|---|---|
| 2011/0050624 A1* | 3/2011 | Lee | ............ | G06F 3/045 |
| | | | | 345/174 |
| 2013/0021268 A1* | 1/2013 | Lee | ............ | G06F 3/045 |
| | | | | 345/173 |
| 2013/0181940 A1* | 7/2013 | Lai | ............ | G06F 3/044 |
| | | | | 345/174 |
| 2014/0320757 A1* | 10/2014 | Hoshtanar | ............ | G06F 3/044 |
| | | | | 349/12 |
| 2015/0242028 A1* | 8/2015 | Roberts | ............ | G06F 3/044 |
| | | | | 345/173 |
| 2016/0109988 A1* | 4/2016 | Wang | ............ | G06F 3/0416 |
| | | | | 345/173 |
| 2016/0124562 A1* | 5/2016 | Lu | ............ | G06F 3/046 |
| | | | | 345/174 |
| 2016/0179266 A1* | 6/2016 | Yang | ............ | G06F 3/0416 |
| | | | | 345/174 |
| 2016/0252989 A1* | 9/2016 | Zhang | ............ | G06F 3/044 |
| | | | | 345/173 |
| 2016/0357306 A1* | 12/2016 | Zou | ............ | G02F 1/13338 |

FOREIGN PATENT DOCUMENTS

| | | | | | |
|---|---|---|---|---|---|
| CN | 103713781 A | * | 4/2014 | | |
| CN | 103713781 A | | 4/2014 | | |
| CN | 104182112 A | * | 12/2014 | ............ | G06F 3/046 |
| CN | 104182112 A | | 12/2014 | | |
| CN | 104461162 A | | 3/2015 | | |
| CN | 204302946 U | | 4/2015 | | |

\* cited by examiner

TOUCH SUBSTRATE, TOUCH PANEL, AND TOUCH DISPLAY DEVICE

CROSS-REFERENCES TO RELATED APPLICATIONS

This application is a national stage of PCT/CN2015/086948, filed on Aug. 14, 2015, which claims the priority of Chinese Patent Application No. CN201410851791.9, filed on Dec. 31, 2014, the entire content of which is incorporated herein by reference.

FIELD OF THE DISCLOSURE

The present disclosure generally relates to the field of touch display technologies and, more particularly, relates to a touch substrate, a touch panel including the touch substrate, and a touch display device including the touch panel.

BACKGROUND

The conventional touch substrate includes a plurality of first electrodes extending in a first direction, a plurality of second electrodes extending in a second direction, and a bonding pad located in the periphery of the touch substrate. The first and second electrodes are usually in a stripe shape. The ends of the first or second electrodes close to the bonding pad are electrically connected to bonding pins on the bonding pad through metal wirings. The external power sources are connected to the bonding pins to supply the voltages to the first and second electrodes and to produce the capacitance between the first and second electrodes.

When a touch happens on the touch substrate, the capacitance between the first and second electrodes varies. The capacitance change detected between the first and second electrodes is used to determine the touch position. However, the first and second electrodes are strip shaped and only one end of each first or second electrode is electrically connected to the bonding pin. Thus, the external power source may only supply the voltage from one end of the first or second electrodes, which may cause a delay in detecting a touch.

To solve the problem set forth above in a conventional touch substrate, both ends of each first electrode may be connected to the same bonding pin on the bonding pad through metal wiring and both ends of each second electrode may be connected to the same bonding pin on the bonding pad through metal wiring. Then the external power sources may supply the voltage to the first and second electrodes from both ends of each first or second electrode. Thus, the delay in detecting the touch motion may be avoided. However, the metal wiring connecting the first electrode to the bonding pins may cross with the metal wiring connecting the second electrode to the bonding pins. Such a configuration may affect the signals carried by the metal wirings and may affect the performance of various control functions through touch motions.

The disclosed touch substrate, the touch panel including the touch substrate, and the touch display device including the touch panel are directed to solve one or more problems set forth above and other problems in the art.

BRIEF SUMMARY OF THE DISCLOSURE

The present disclosure provides a touch substrate, a touch panel, and a touch display device. The touch substrate not only realizes that the first and second electrodes are powered from both ends but also ensures that the metal wirings connecting the electrodes to the bonding pins are not crossly configured.

One aspect of the present disclosure provides a touch substrate. The touch substrate includes a first electrode extending in a first direction. The first electrode is of a U shape, and includes a first longitudinal portion extending in the first direction, a second longitudinal portion extending in the first direction, and a third connecting portion. The first longitudinal portion includes a first terminal at an distal end from the connecting portion, and the second longitudinal portion includes a second terminal at an distal end from the connecting portion.

Further, the touch substrate includes a second electrode extending in a second direction with one or more terminals.

Further, the touch substrate includes at least one bonding pad located at the periphery of the touch substrate with a plurality of bonding pins. The two terminals of the first electrode are connected to the bonding pins through metal wirings.

Further, each terminal of the first and second electrodes is connected to a separate bonding pin. The two terminals of the first electrode are connected to two adjacent bonding pins on the bonding pad. The first electrode opens toward the bonding pad.

Further, the second electrode is of a strip shape. The width of the first longitudinal portion and the second longitudinal portion of the first electrode is half of the width of the second electrode. The first direction is perpendicular to the second direction.

Optionally, the second electrode is of a U shape. The second electrode includes a first longitudinal portion extending in the second direction, a second longitudinal portion extending in the second direction, and a connecting portion; and the first longitudinal portion includes a first terminal at an distal end from the connecting portion, and the second longitudinal portion includes a second terminal at an distal end from the connecting portion.

Further, the touch substrate includes two bonding pads located at the periphery of the touch substrate with a plurality of bonding pins. The first electrode couples with a first bonding pad. The two terminals of the first electrodes are connected to bonding pins of the first bonding pad through metal wirings. The second electrode couples with a second bonding pad. The second electrode is connected to bonding pins of the second bonding pad through metal wirings.

Further, the touch substrate includes two bonding pads located at the periphery of the touch substrate with a plurality of bonding pins. The first electrode opens towards a first bonding pad. The two terminals of the first electrodes are connected to bonding pins of the first bonding pad through metal wirings. The second electrode opens towards a second bonding pad. The two terminals of the second electrode is connected to bonding pins of the second bonding pad through metal wirings.

The metal wirings connecting the first electrode to the bonding pins and the metal wirings connecting the second electrode to the bonding pins are in a same layer.

Further, each terminal of the first and second electrodes is connected to a separate bonding pin. The two terminals of each of the first and second electrodes are connected to two adjacent bonding pins on the bonding pad.

Another aspect of the present disclosure provides a touch panel including the touch substrate described above. Further, the touch panel includes a flexible printed circuit (FPC). The FPC is used to electrically connect two bonding pins connected to two terminals of a same electrode.

Another aspect of the present disclosure provides a touch display device including the touch panel described above.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

Figure 1:
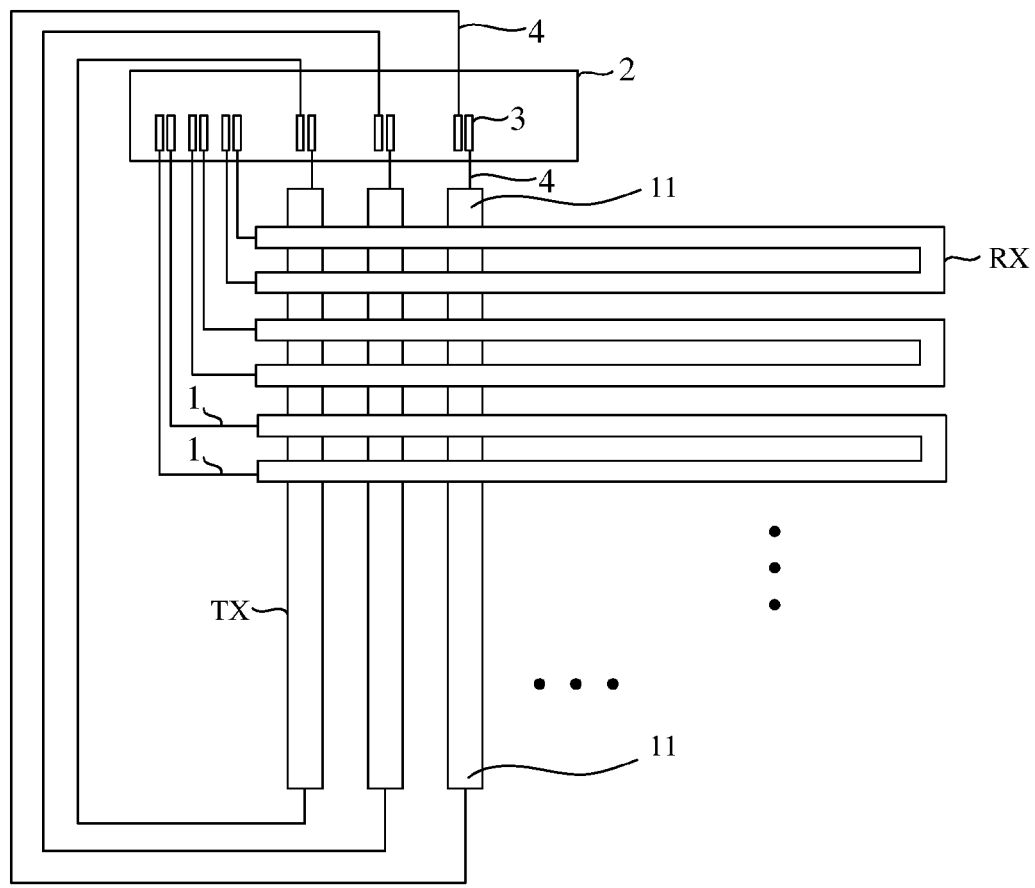
FIG. 1 illustrates a schematic view of an exemplary touch substrate according to a first embodiment of the present disclosure.

The reference numerals used in the above figures include: first electrodes RX, terminals 11, second electrodes TX, first electrode metal wirings 1, second electrode metal wirings 4, bonding pads 2, 5, 6, and bonding pins 3.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts. It should be understood that the exemplary embodiments described herein are only intended to illustrate and explain the present invention and not to limit the invention.

First Exemplary Embodiment

Figure 2:
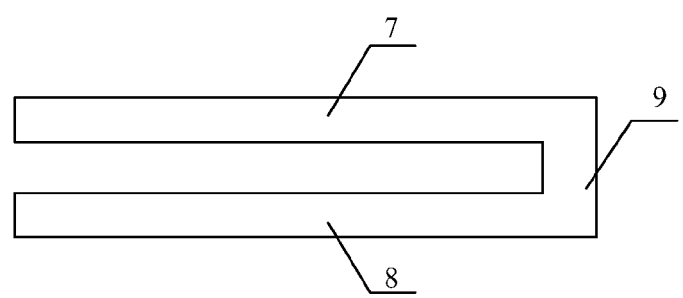
FIG. 2 illustrates a schematic view of an exemplary U shape electrode structure according to the first embodiment of the present disclosure.

FIG. 1 illustrates a schematic view of an exemplary touch substrate according to the first embodiment of the present disclosure. FIG. 2 illustrates a schematic view of an exemplary U shape electrode structure according to the first embodiment of the present disclosure.

As shown in FIGS. 1-2, the touch substrate includes at least one first electrode RX extending in a first direction (the horizontal direction in FIG. 1) and at least one second electrode extending in a second direction (the vertical direction in FIG. 1). The first electrode RX is of a U shape. The second electrode is of a strip shape. The U shaped first electrode RX includes a first portion 7 and a second portion 8 arranged in parallel with each other and both extending in the first direction, and a third portion 9 connecting the first portion 7 to the second portion 8. The first portion 7 and the second portion 8 are extended in a direction representing the extension direction of the U shaped electrode. In the present disclosure, the first portion 7 and the second portion 8 may also be referred to as longitudinal portions. The third portion 9 may also be referred to as a connecting portion.

In one embodiment, the first direction is in a horizontal direction. The second direction is in a vertical direction. The first direction is perpendicular to the second direction. However, the present disclosure is not limited to such a configuration.

In one embodiment, the touch substrate also includes at least one bonding pad 2. A plurality of bonding pins 3 is configured on the bonding pad 2. Both ends of the first electrode RX are connected to bonding pins 3 through metal wirings 1. Similarly, both ends of the second electrode TX are connected to bonding pins 3 through metal wirings 4. The distal ends of the electrodes connecting to the bonding pins and bonding pads may be referred to as terminals 11. Note that only one bonding pad 2 is shown in FIG. 1. However, the present disclosure is not limited to such a configuration.

Referring back to FIG. 1, the present disclosure not only ensures that the first and second electrodes (RX and TX) are powered from both ends (terminals) but also avoids the cross configuration of the metal wirings 1 connecting the first electrodes RX to the bonding pins 3 and the metal wirings 4 connecting the second electrodes TX to the bonding pins 3. Thus, the disclosed touch substrate improves the loading speed and transmission speed of power signals to the first and second electrodes (RX and TX) and thus effectively improves the performance of various control functions through touch motions.

The metal wirings 1 connecting the first electrodes RX to the bonding pins 3 and the metal wirings 4 connecting the second electrodes TX to the bonding pins 3 are configured in a same layer. Because the metal wirings 1 connecting the first electrodes RX to the bonding pins 3 and the metal wirings 4 connecting the second electrodes TX to the bonding pins 3 do not cross, the metal wirings 1 and 4 are configured in the same layer. The metal wirings 1 and 4 may be formed through a same patterning process. As a result, the fabrication process of the metal wirings 1 and 4 is simplified.

In one embodiment, both ends (or both terminals) 11 of each first or second electrode may be connected to a same bonding pin 3. In another embodiment, both ends of the electrode may be connected to two different bonding pins 3 to test the corresponding electrode. Specifically, when the measured impedance between the two ends of an electrode is within a pre-determined range, the electrode positioned between the two bonding pins 3 would pass the test. When the measured impedance is not within a pre-determined range, for example, the electrode may be in an open circuit state which has significantly large impedance; the electrode positioned between the two bonding pins 3 would fail the test. In one embodiment, the bonding pins 3 connecting to both ends of the first or second electrodes (RX/TX) are adjacent to each other. The test of the electrode is by measuring the impedance between each pair of neighboring bonding pins 3 on the bonding pad 2. Thus, the test procedure is straight forward.

As shown in FIG. 1, the bonding pad 2 may be located at the upper left corner of the touch substrate. The U shaped first electrode RX may open toward the left side. Such configuration reduces the distance between the two ends of a first electrode RX and the bonding pins 3, and the length and impedance of the corresponding metal wirings 1. Thus, it is favorable for the power signal transmission.

Figure 3:
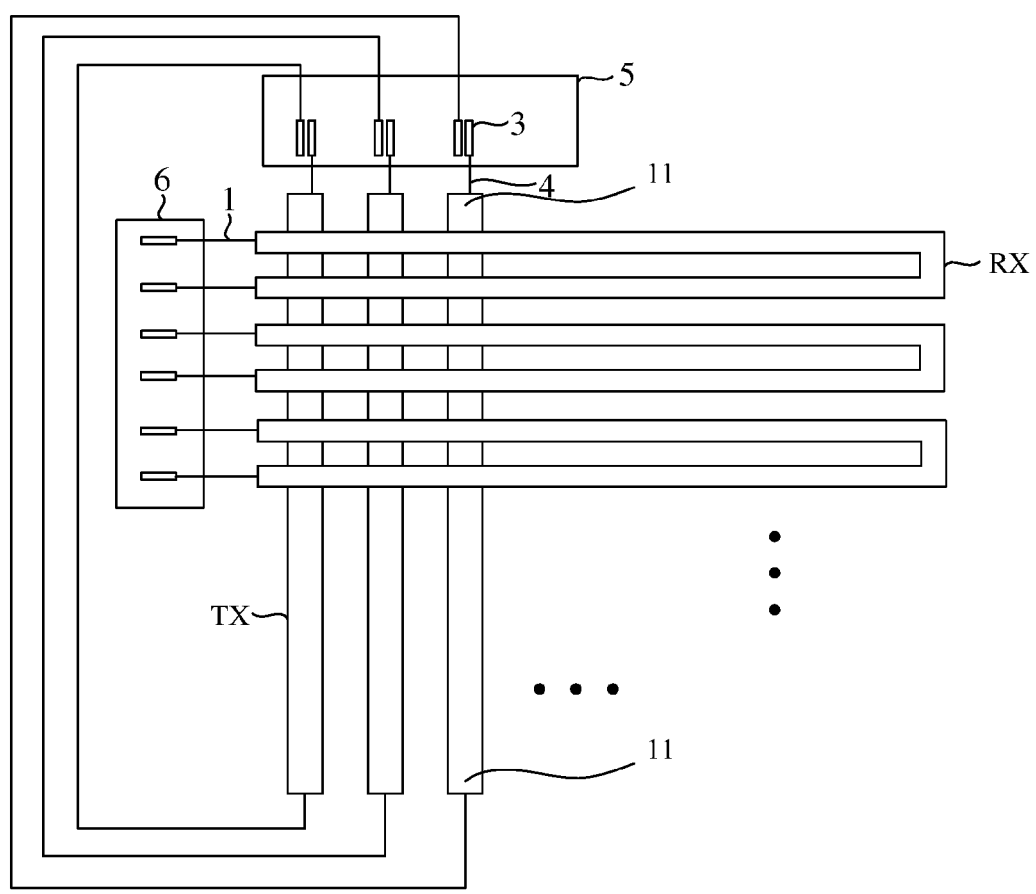
FIG. 3 illustrates a schematic view of another exemplary touch substrate according to the first embodiment of the present disclosure.

FIG. 3 illustrates a schematic view of another exemplary touch substrate according to the first embodiment of the present disclosure. Compared to the touch substrate in FIG. 1, the touch substrate in FIG. 3 includes two bonding pads 5 and 6. The bonding pad 6 corresponding to the first electrodes RX is located at the left side of the touch substrate. The bonding pad 5 corresponding to the second electrodes TX is located at the top side of the touch substrate. Each U shaped first electrode RX opens toward the corresponding bonding pad 6 (toward the left side). Such configuration reduces the length of the metal wirings 1 connecting the first electrodes RX to the bonding pins 3 on the corresponding bonding pad 6.

In addition, to ensure that the disclosed touch substrate has a mutual capacitance between the U shaped first electrode RX and the strip shaped second electrode TX equal to the mutual capacitance between the strip shaped first electrodes and second electrodes in a conventional touch substrate, the disclosed touch substrate has a width of the strip shaped second electrode TX equal to the width of the strip shaped second electrode in a conventional touch substrate. Further, the width of the first portion 7 or the second portion 8 (FIG. 2) of the first electrode RX is configured to be half of the width of the strip shaped first electrode in a conventional touch substrate.

Note that the disclosed touch substrate may include a plurality of second electrodes TX configured in a U shape and a plurality of first electrode RX configured in a strip shape. In this case, the first and second electrodes RX and TX are driven from both ends. The metal wirings 1 connecting the first electrodes RX to the bonding pins 3 and the metal wiring 4 connecting the second electrodes TX to the bonding pins 3 are not crossly configured. The detail description may be referred to the case in which the first electrode RX is of a U shape and the second electrode TX is of a strip shape.

The present embodiment provides a touch substrate. The touch substrate includes a plurality of first electrodes and a plurality of second electrodes. Either the shape of the first electrode or the second electrode may be in a U shape. Both ends of the first and second electrodes are electrically connected to the bonding pins on the corresponding bonding pad through metal wirings. In the touch substrate, the first and second electrodes are driven from both ends. The metal wirings connecting the electrodes to the bonding pins do not cross. Thus, the present disclosure not only increases the loading speed and the transmission speed of the power signals to the first and second electrodes but also improves the detection of the touch motions by the touch substrate.

Second Exemplary Embodiment

Figure 4:
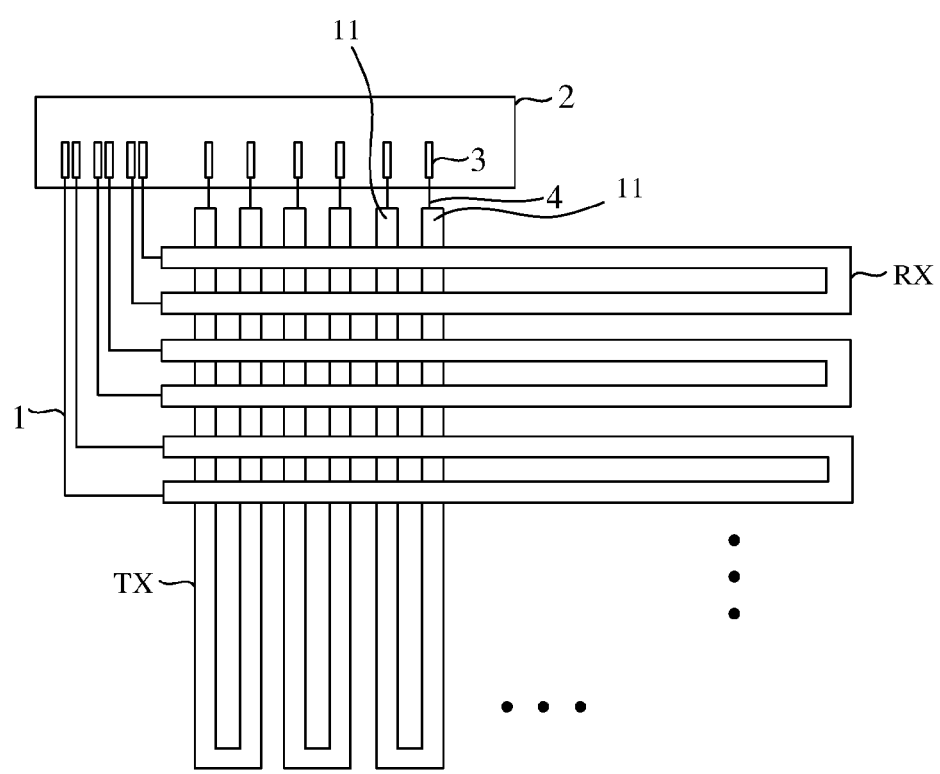
FIG. 4 illustrates a schematic view of an exemplary touch substrate according to a second embodiment of the present disclosure.

FIG. 4 illustrates a schematic view of an exemplary touch substrate according to a second embodiment of the present disclosure. Compared to the touch substrate of the first embodiment, the touch substrate in FIG. 4 includes a plurality of first electrodes and a plurality of second electrodes both in a U shape. The U shaped first electrode opens toward the left side. The U shaped second electrode opens toward the top side.

Because the first electrode RX and the second electrode TX are driven from both ends, the metal wirings 1 connecting a first electrode to the bonding pins 3 and the metal wirings 4 connecting a second electrode to the bonding pins do not cross. Thus, the disclosed touch substrate configuration would not only increase the loading speed and the transmission speed of the power signals to the first and second electrodes RX and TX but also would improve the performance of touch detection by the substrate.

In the touch substrate in FIG. 4, a second electrode TX is configured in a U shape. The U shaped second electrode TX opens toward the bonding pad 2. Such a configuration effectively reduces the length of the metal wirings 4 connecting the second electrode TX to the bonding pins 3.

Figure 5:
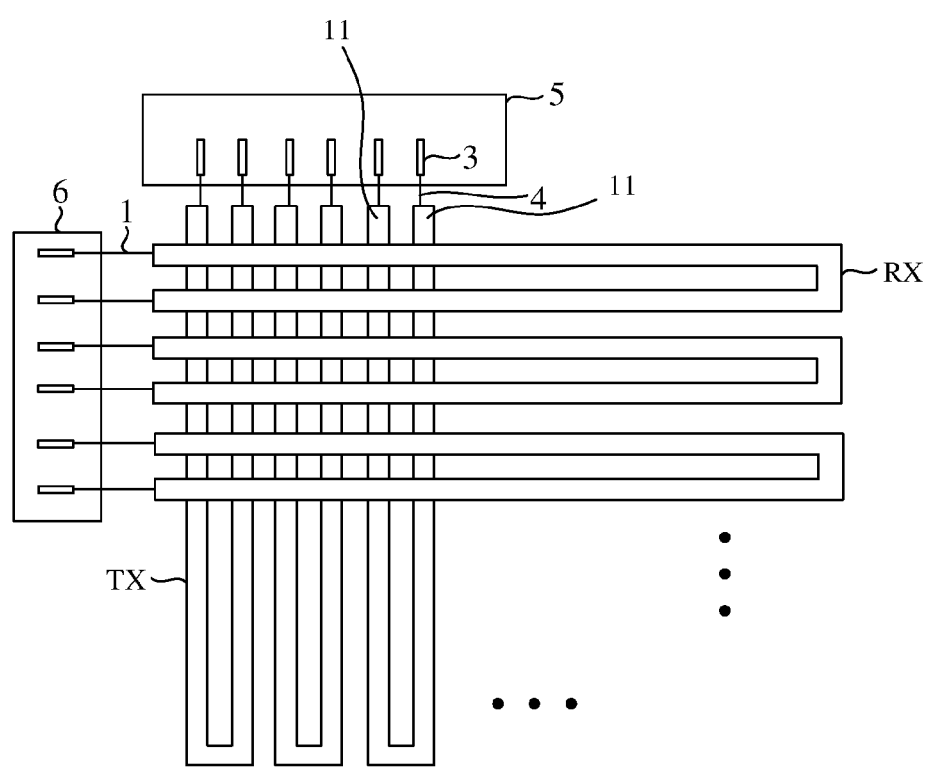
FIG. 5 illustrates a schematic view of another exemplary touch substrate according to the second embodiment of the present disclosure.

FIG. 5 illustrates a schematic view of another exemplary touch substrate according to the second embodiment of the present disclosure. Compared to the touch substrate in FIG. 4, the touch substrate in FIG. 5 includes two bonding pads 5 and 6. The bonding pad 6 corresponding to the first electrodes RX is located at the left side of the touch substrate. The bonding pad 5 corresponding to the second electrodes TX is located at the top side of the touch substrate. Each of the U shaped first electrodes RX opens toward the corresponding bonding pad 6 (toward the left side). Each of the U shaped second electrode TX opens toward the corresponding bonding pad 5 (toward the top side). Such configuration reduces the length of the metal wirings 1 connecting the first electrodes RX to the bonding pins 3 on the corresponding bonding pad 5.

The present embodiment provides a touch substrate. The touch substrate includes a plurality of first electrodes and a plurality of second electrodes. Both the first electrode and the second electrode may be of a U shape. Both ends of the first and second electrodes are electrically connected to the bonding pins on the corresponding bonding pad through metal wirings. In the touch substrate, the first and second electrodes are driven from both ends. The metal wirings connecting the electrodes to the bonding pins do not cross. Thus, the present disclosure not only increases the loading speed and the transmission speed of the power signals to the first and second electrodes but also improves the performance of detecting touch motions by the touch substrate.

Third Exemplary Embodiment

A third embodiment of the present disclosure provides a touch panel. The touch panel includes the touch substrate disclosed in the first or second embodiment. The specifics of the touch substrate can be found in the detail descriptions of the first or second embodiment.

In addition, the touch substrate may have at least one bonding pad in the periphery. The bonding pad is configured with a plurality of bonding pins. Both ends of the first electrode and second electrode are electrically connected to the bonding pins through metal wirings. Each end of the first or second electrode is connected to a separate bonding pin. The touch substrate may also include a flexible printed circuit (FPC). When connected to a bonding pad, the FPC is used to electrically connect the two bonding pins of the same electrode together.

In one embodiment, the two bonding pins of the same electrode are electrically connected through the FPC. The two bonding pins of the same electrode may be defined as a single bonding pin. Thus, both ends of the electrode are connected to a single bonding pin to transmit or receive power signals.

Because the touch panel includes the touch substrate disclosed in the first or second embodiment, the touch panel inherits all the advantageous effects described in the first or second embodiment.

In addition, the present embodiment also provides a touch display device. The touch display device includes the touch panel. The touch panel includes the touch substrate disclosed in the first or second embodiment. Thus, the touch display device inherits all the advantageous effects described in the first or second embodiment.

The embodiments disclosed herein are exemplary only. Other applications, advantages, alternations, modifications, or equivalents to the disclosed embodiments are obvious to those skilled in the art and are intended to be encompassed within the scope of the present disclosure.

What is claimed is:

1. A touch substrate, comprising a first electrode extending in a first direction, a second electrode extending in a second direction with one or more terminals, and two bonding pads located at periphery of the touch substrate with a plurality of bonding pins, wherein:
the first electrode is of a U shape, and includes a first longitudinal portion extending in the first direction, a second longitudinal portion extending in the first direction, and a third connecting portion;
the first longitudinal portion includes a first terminal at an distal end from the connecting portion, and the second longitudinal portion includes a second terminal at an distal end from the connecting portion,
the first electrode couples with a first bonding pad;
the two terminals of the first electrodes are connected to bonding pins of the first bonding pad through metal wirings;
the second electrode couples with a second bonding pad; and
the second electrode is connected to bonding pins of the second bonding pad through metal wirings.

2. The touch substrate of claim 1, further comprising at least one bonding pad located at the periphery of the touch substrate with a plurality of bonding pins, wherein:
both terminals of the first electrode are connected to the bonding pins through metal wirings.

3. The touch substrate of claim 2, wherein the first electrode opens toward the bonding, pad.

4. The touch substrate of claim 1, wherein each terminal of the first and second electrodes is connected to a separate bonding pin.

5. The touch substrate of claim 4, wherein the two terminals of the first electrode are connected to two adjacent bonding pins on the bonding pad.

6. The touch substrate of claim 1, wherein:
the second electrode is of a strip shape; and
the width of the first longitudinal portion and the second longitudinal portion of the first electrode is half of the width of the second electrode.

7. The touch substrate of claim 1, wherein the first direction is perpendicular to the second direction.

8. The touch substrate of claim 1, wherein the second electrode is of a U shape; the second electrode includes a first longitudinal portion extending in the second direction, a second longitudinal portion extending in the second direction, and a connecting portion; and the first longitudinal portion includes a first terminal at an distal end from the connecting portion, and the second longitudinal portion includes a second terminal at an distal end from the connecting portion.

9. The touch substrate of claim 8, wherein the two terminals of each of the first and second electrodes are connected to two adjacent bonding pins on the bonding pad.

10. The touch substrate of claim 1, wherein each terminal of the first and second electrodes is connected to a separate bonding pin.

11. A touch panel, including the touch substrate of claim 1.

12. The touch panel of claim 11, wherein:
the touch panel includes a flexible printed circuit (FPC); and
the FPC is used to electrically connect two bonding pins connected to two terminals of a same electrode.

13. A touch display device, including the touch panel of claim 12.

14. A touch display device, including the touch panel of claim 11.

* * * * *